(12) United States Patent
Venkateswarlu

(10) Patent No.: US 8,306,054 B2
(45) Date of Patent: Nov. 6, 2012

(54) APPARATUS AND METHOD FOR PROVIDING PDG INFORMATION

(75) Inventor: Suraparaju Venkateswarlu, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 689 days.

(21) Appl. No.: 12/018,666

(22) Filed: Jan. 23, 2008

(65) Prior Publication Data

US 2008/0175267 A1 Jul. 24, 2008

(30) Foreign Application Priority Data

Jan. 23, 2007 (KR) .................. 10-2007-0006851

(51) Int. Cl.
*H04J 3/16* (2006.01)
(52) U.S. Cl. ........................................ 370/465
(58) Field of Classification Search ............... None
See application file for complete search history.

(56) References Cited

U.S. PATENT DOCUMENTS

| | | | | |
|---|---|---|---|---|
| 6,690,655 | B1 * | 2/2004 | Miner et al. | 370/278 |
| 7,660,584 | B2 * | 2/2010 | Maxwell et al. | 455/436 |
| 2004/0131061 | A1 * | 7/2004 | Matsuoka et al. | 370/392 |
| 2005/0213566 | A1 | 9/2005 | Jutila et al. | |
| 2006/0104234 | A1 | 5/2006 | Zhang | |
| 2006/0123470 | A1 * | 6/2006 | Chen | 726/5 |
| 2007/0120705 | A1 * | 5/2007 | Kiiskila et al. | 340/870.02 |
| 2007/0124472 | A1 * | 5/2007 | Requena | 709/225 |
| 2008/0146278 | A1 * | 6/2008 | Rofougaran | 455/557 |
| 2009/0052415 | A1 * | 2/2009 | Ishii et al. | 370/338 |
| 2009/0213751 | A1 * | 8/2009 | Langefeld et al. | 370/254 |

FOREIGN PATENT DOCUMENTS

| | | |
|---|---|---|
| EP | 1 650 999 | 4/2006 |
| KR | 1020060017509 | 2/2006 |
| KR | 1020060036768 | 5/2006 |
| KR | 1020060049510 | 5/2006 |
| KR | 1020060065569 | 6/2006 |
| WO | WO 2005/074193 | 8/2005 |

OTHER PUBLICATIONS

WO2006/109462, Iishi et al., publ. date Oct. 19, 2006.*
WO2006/100184, Langefeld et al., publ. date Sep. 28, 2006.*
"Universal Mobile Telecommunications System (UMTS); 3GPP System to Wireless Local Area Network (WLAN) Interworking; Stage 3", Sep. 2005.
3rd Generation Partnership Project; Technical Specification Group Core Network and Terminals; 3GPP TS 31.102 v6.16.0 "Characteristics of the Universal Subscriber Identity Module (USIM) Application (Release 6)", XP50373448, Nov. 2006.

\* cited by examiner

*Primary Examiner* — John Blanton
(74) *Attorney, Agent, or Firm* — The Farrell Law Firm, P.C.

(57) ABSTRACT

Provided is an apparatus and method for providing and updating PDG information. In a method for updating PDG information in a terminal, an instruction indicating an update of PDG information is received from a network apparatus. PDG information is received from the network apparatus and the received PDG information is stored in a storage unit to perform an update operation.

20 Claims, 6 Drawing Sheets

| IDENTIFIER: '4F47' | STRUCTURE: LINEAR FIXED | OPTIONAL |
|---|---|---|
| | | |
| RECORD LENGTH: X BYTES | UPDATE ACTIVITY: LOW | |
| ACCESS CONDITIONS: <br>    READ <br>    UPDATE <br>    DEACTIVATE <br>    ACTIVATE | PIN <br> ADM <br> ADM <br> ADN | |

| BYTES | DESCRIPTION | M/O/C | LENGTH |
|---|---|---|---|
| 1 | ADDRESS TYPE | M | 1 BYTES |
| 2 | ADDRESS LENGTH | M | 1 BYTES |
| 3 TO X+2 | PDG ADDRESS | M | X BYTES |
| X+3 | MAX FAILED ATTEMPTS | C | 1 BYTES |

NOTE: THE FILEDS MARKED C ABOVE ARE MANDATORY ONLY IF THE ADDRESS TYPE IS 0x01 OR 0x02

FIG.6A

| VALUE | NAME |
|---|---|
| 0x00 | FQDN |
| 0x01 | IPv4 |
| 0x02 | IPv6 |
| ALL OTHER VALUES ARE RESERVED | |

FIG.6B

| FILE IDENTIFICATION | DESCRIPTION | CHANGE ADVISED |
|---|---|---|
| '4F47' | PDG INFORMATION | CAUTION (NOTE) |
| NOTE: IF EF PDG ARE CHANGED, THE UICC SHOULD ISSUE A CAT REFRESH COMMAND [22] | | |

FIG.6C

APPARATUS AND METHOD FOR PROVIDING PDG INFORMATION

PRIORITY

This application claims priority under 35 U.S.C. §119 to an application filed in the Korean Intellectual Property Office on Jan. 23, 2007 and allocated Serial No. 2007-6851, the contents of which are incorporated herein by reference.

BACKGROUND OF THE INVENTION

1. Field of the Invention

The present invention relates generally to an apparatus and method for providing information on a packet data gateway (PDG), and in particular, to an apparatus and method for providing information on a PDG to a terminal and allowing the terminal to connect with the PDG easily.

2. Description of the Related Art

A packet data gateway (PDG) is a node of a network serving as a gateway used for connecting a terminal in an IP multimedia subsystem (IMS) in a 3rd Generation Partnership Project (3GPP) system. For this purpose, packet exchange and control information exchange for the packet exchange between the IMS and the 3GPP system are performed through the PDG.

FIG. 1 is a diagram illustrating a general procedure of IMS registration.

Referring to FIG. 1, user equipment (UE) 110 connects with an access network such as wireless LAN (WLAN) in steps 1, 2 and 3. Thereafter, the UE 110 retrieves an address of a PDG 122 in step 4 and establishes a tunnel to the PDG 122 in step 5. In steps 6, 7 and 8, the UE 110 connects with core networks 150, 160, 165 and 170 to perform an authentication process.

When the UE 110 does not know the address of the PDG 122, the UE 110 can obtain the address by retrieving a domain name system (DNS) 120. As described above, the UE 110 must connect with the PDG for the IMS registration. However, current standard specifications do not describe processes of notifying and storing information on the PDG (hereinafter PDG information).

FIG. 2 is a diagram illustrating general configuration of networks using PDGs.

Referring to FIG. 2, generally, UE 250 has information on a home network 210 including information on a PDG 215 of the home network 210, so that the UE 250 can connect with the home network 210 without difficulty in step A.

However, when the UE 250 attempts to connect with a visited network 230 in step B, the UE 250 must know an address of a PDG 235 of the visited network 230.

As described above, prior standard specifications do not describe PDG information and provide an update of the PDG information and thus there is a need to define the processes of storing and updating the PDG information.

SUMMARY OF THE INVENTION

An object of the present invention is to substantially solve at least the above problems and/or disadvantages and to provide at least the advantages below. Accordingly, an object of the present invention is to provide an apparatus and method for providing PDG information.

Another object of the present invention is to provide an apparatus and method for enabling network operators to store PDG information in a Universal Subscriber Identity Module (USIM) card of a terminal and to update PDG information.

Still another object of the present invention is to provide a USIM card included in a terminal that can store and update PDG information, and a corresponding method.

According to one aspect of the present invention, a method for updating information on a PDG in a terminal includes receiving an instruction indicating an update of PDG information from a network apparatus; and receiving PDG information from the network apparatus, storing the PDG information in a storage unit, and performing an update operation.

According to another aspect of the present invention, a method for providing information on a PDG in a network apparatus includes determining if a provision of PDG information is requested; loading PDG information when the provision of PDG information is requested; transmitting the loaded PDG information to a terminal.

According to still another aspect of the present invention, a terminal for updating information on a PDG includes a communication module for communicating with another node; a PDG information manager for receiving an instruction indicating an update of PDG information from a network apparatus via the communication module, receiving PDG information from the network apparatus, storing the PDG information in a storage unit, and performing an update operation; and the storage unit for storing the PDG information.

According to even another aspect of the present invention, a network apparatus for providing information on a PDG includes a communication module for communicating with another node; a PDG information manager for determining if a provision of PDG information is requested via the communication module, loading PDG information when the provision of PDG information is requested, transmitting the loaded PDG information to a terminal.

According to even still another aspect of the present invention, a communication system for updating information on a PDG includes a network apparatus for determining if a provision of PDG information is requested, loading the PDG information when the provision of PDG information is requested, storing the PDG information in a storage unit, and transmitting the PDG information to a terminal; and a terminal for receiving an instruction indicating an update of the PDG information from a network, receiving the PDG information from the network apparatus, storing the PDG information in a storage unit, and performing an update operation.

BRIEF DESCRIPTION OF THE DRAWINGS

The above and other objects, features and advantages of the present invention will become more apparent from the following detailed description when taken in conjunction with the accompanying drawings in which:

FIGS. 6A through 6C are tables showing PDG information according to an embodiment of the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary details.

The present invention provides an apparatus and method for providing information on a packet data gateway (PDG) (hereinafter PDG information).

Figure 1:
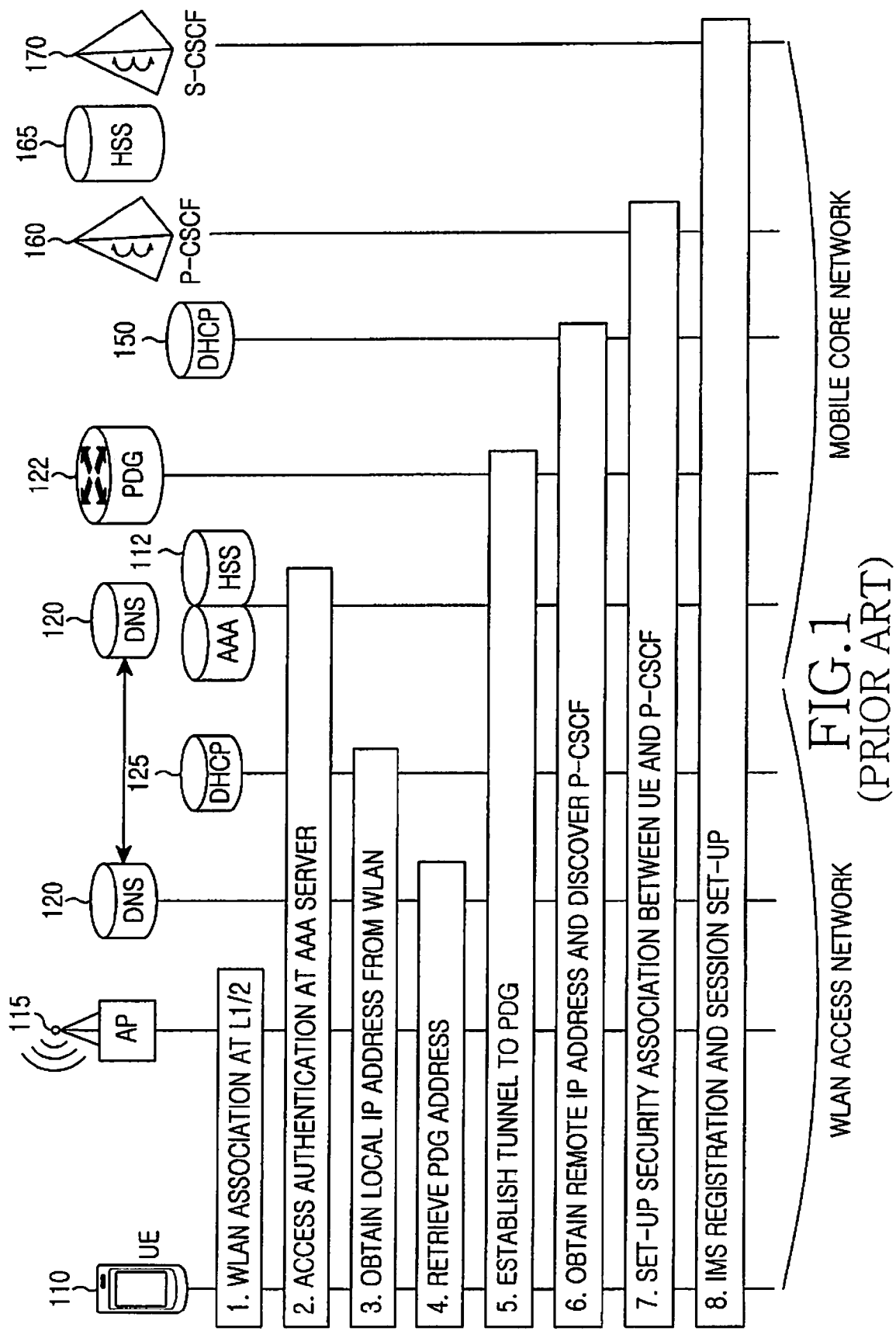
FIG. 1 is a diagram illustrating a general procedure of IMS registration.
Figure 2:
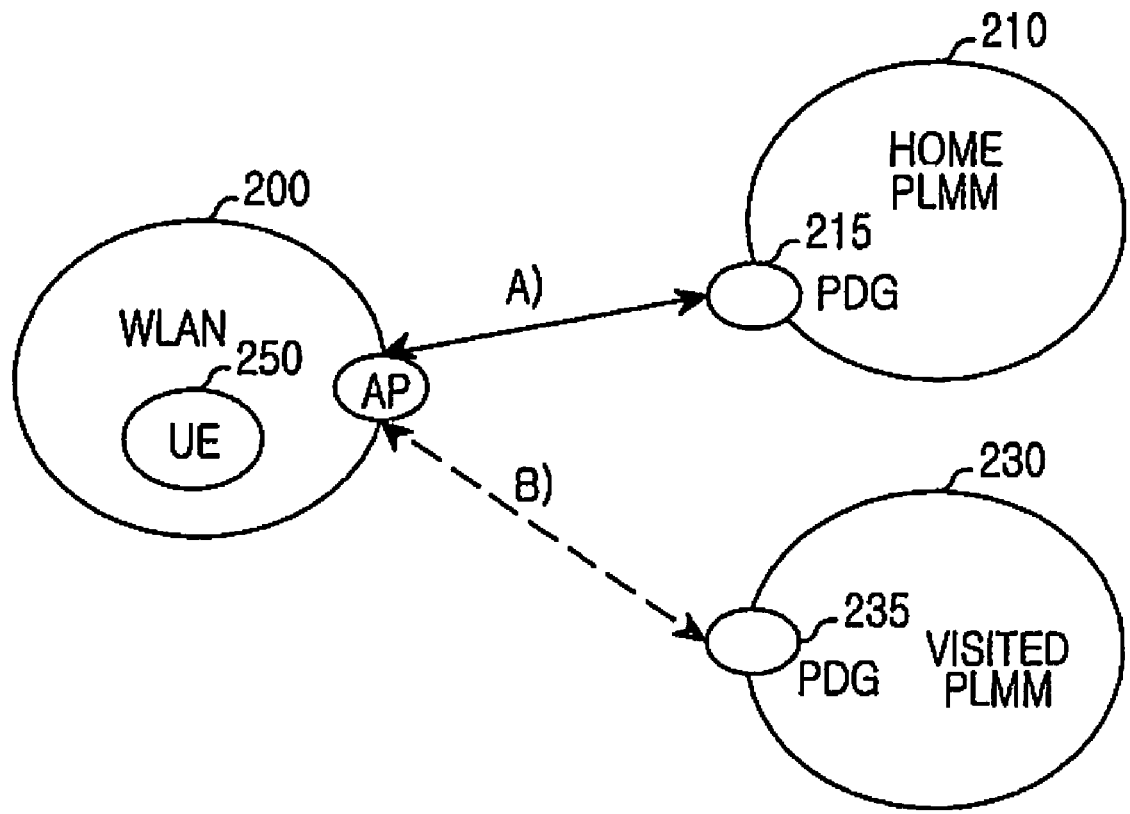
FIG. 2 is a diagram illustrating general configuration of networks using PDGs.
Figure 3:
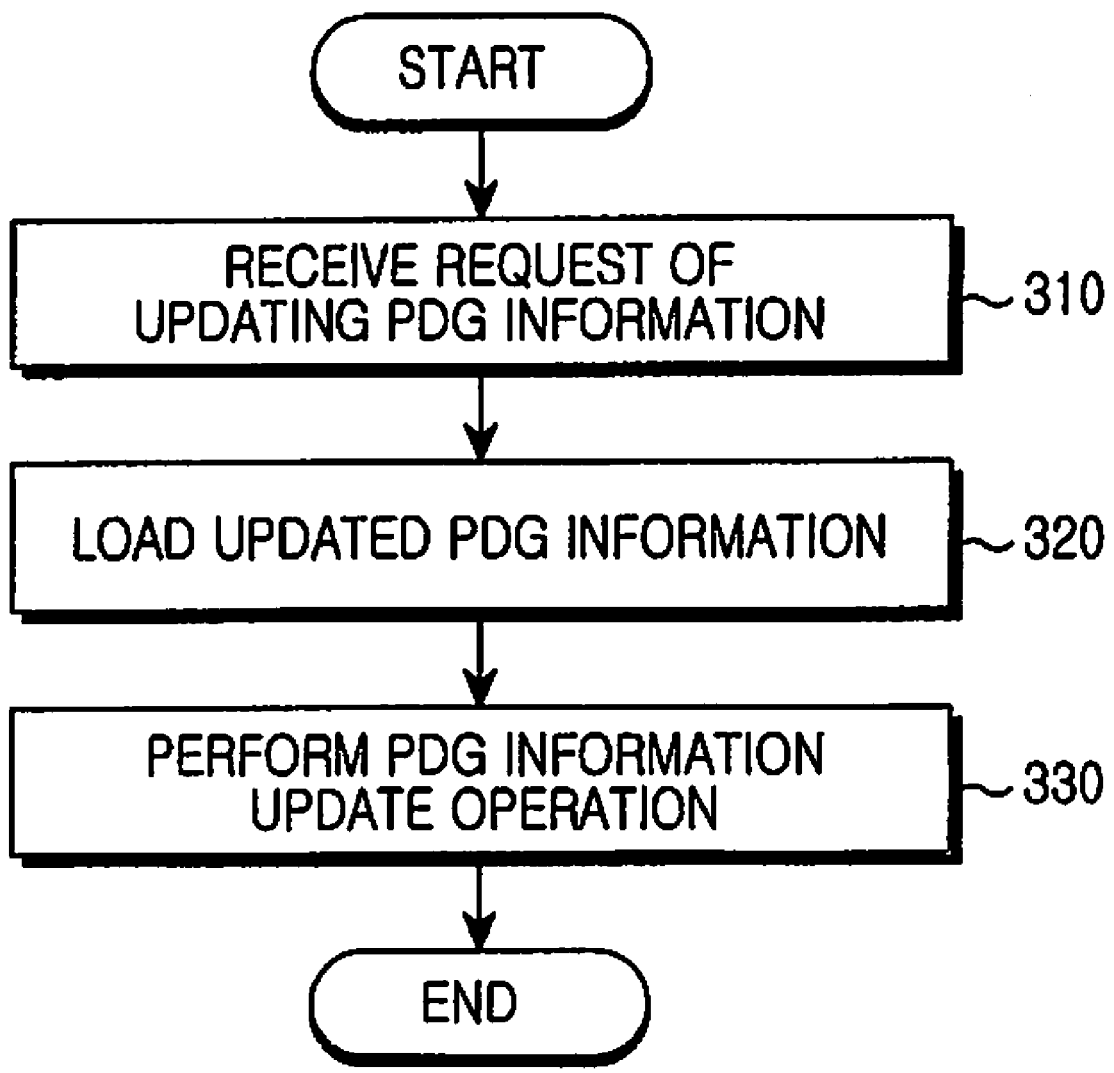
FIG. 3 is a flowchart illustrating an operation procedure of a network apparatus according to an embodiment of the present invention.

FIG. 3 is a flowchart illustrating an operation procedure of a network apparatus according to an embodiment of the present invention.

Referring to FIG. 3, in step 310, the network apparatus receives a request of updating PDG information and in step 320, loads updated PDG information stored in a storage unit. In step 330, the network apparatus performs a PDG information update operation for a corresponding terminal. Thereafter, the operation procedure is ended. The PDG information will be described in detail with reference to FIGS. 6A to 6C.

Figure 4:
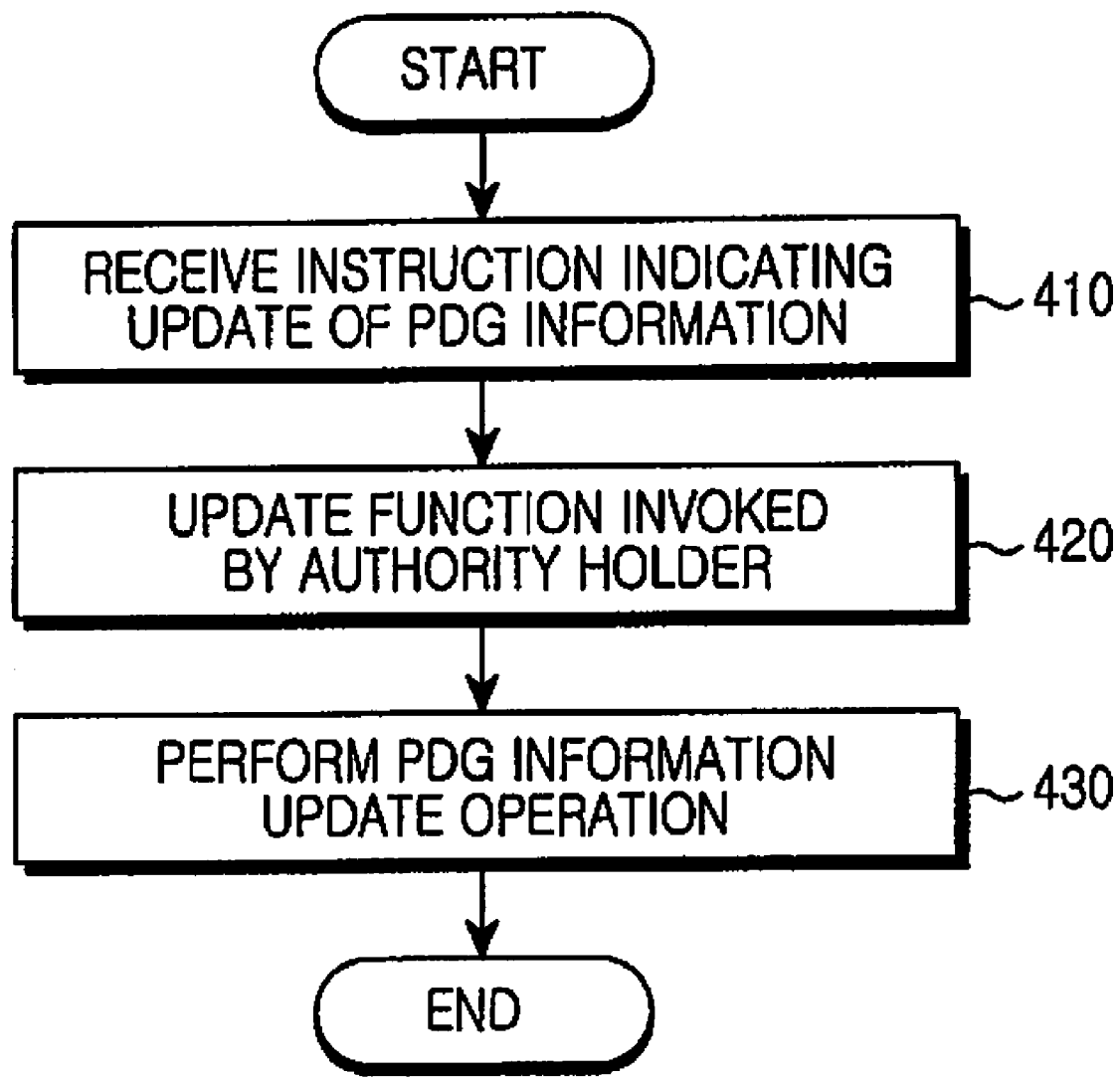
FIG. 4 is a flowchart illustrating an operation procedure of a terminal according to an embodiment of the present invention.

FIG. 4 is a flowchart illustrating an operation procedure of a terminal according to an embodiment of the present invention.

Referring to FIG. 4, in step 410, the terminal receives an instruction indicating an update of PDG information from a network apparatus.

In step 420, in order to update PDG information stored in a USIM of the terminal, an update function is invoked by an authority holder, i.e., an authenticated network apparatus. In step 430, the terminal performs a PDG information update operation. Thereafter, the operation procedure is ended. The PDG information will be described in detail with reference to FIGS. 6A to 6C.

Figure 5:
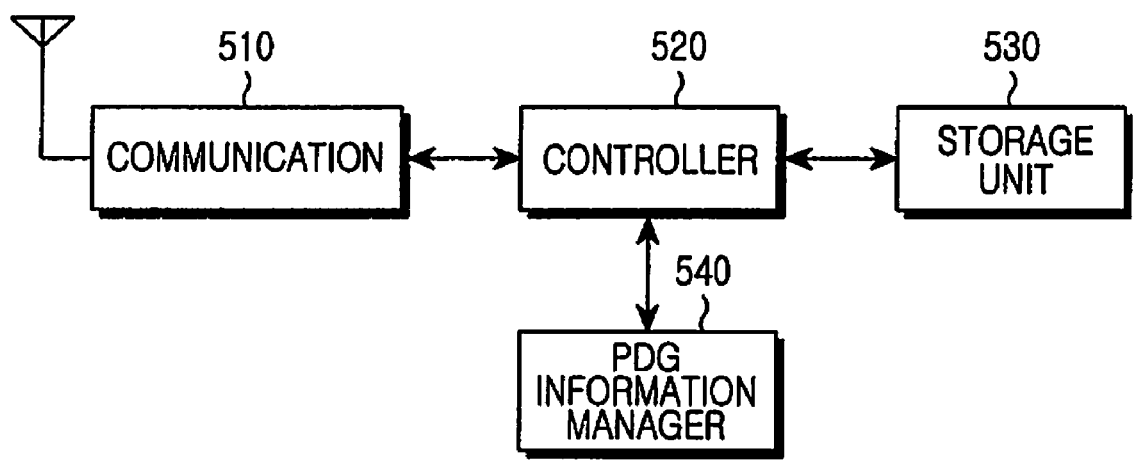
FIG. 5 is a block diagram of a network apparatus/a terminal according to an embodiment of the present invention.

FIG. 5 is a block diagram of a network apparatus/a terminal according to an embodiment of the present invention.

A communication module 510 in a network apparatus is a module for communicating with another node and includes a cable processor, an RF processor, and a baseband processor. The RF processor converts a signal received through an antenna into a baseband signal and provides the baseband signal to the baseband processor. Further, the RF processor converts a baseband signal received from the baseband processor into an RF signal suitable for over-the-air transmission, and transmits the RF signal through the antenna. The cable processor converts a signal received through a cable into a baseband signal and provides the baseband signal to the baseband processor. Further, the cable processor converts a baseband signal received from the baseband processor into a cable signal suitable for cable transmission and transmits the cable signal through the cable.

The controller 520 processes and controls an overall operation of the network apparatus. For example, the controller 520 processes and controls data communication and voice communication. In addition to general functions, the controller 520 controls a PDG information manager 540. As a result, a terminal updates PDG information stored in the terminal and stores the updated PDG information in a USIM according to the present invention.

A storage unit 530 stores a program for controlling the overall operation of the network apparatus and temporary data generated during the execution of the program. Particularly, the storage unit 530 stores the PDG information according to the present invention.

The PDG information manager 540 loads PDG information from the storage unit 530 based on control of the controller 520 and information provided by the controller 520 to transmit the PDG information to a terminal. The PDG information will be described in detail with reference to FIGS. 6A to 6C.

In the above-described configuration, the controller 520 may perform the functions of the PDG information manager 540. Herein, separate units are provided for the respective functions in order to explain the functions clearly. However, in the real products, the controller 520 may be configured to perform all or some of the functions of the PDG information manager 540.

A communication module 510 in a terminal is a module for communicating with another node and includes an RF processor and a baseband processor. The RF processor converts a signal received through an antenna into a baseband signal and provides the baseband signal to the baseband processor. Further, the RF processor converts a baseband signal received from the baseband processor into an RF signal suitable for over-the-air transmission, and transmits the RF signal through the antenna.

The controller 520 processes and controls an overall operation of the terminal. For example, the controller 520 processes and controls data communication and voice communication. In addition to general functions, under instruction of the network apparatus, the controller 520 controls a PDG information manager 540 to update PDG information and stores the updated PDG information in a USIM according to the present invention.

A storage unit 530 stores a program for controlling the overall operation of the terminal and temporary data generated during the execution of the program. Particularly, the storage unit 530 includes the USIM storing the PDG information according to the present invention.

The PDG information manager 540 updates PDG information based on control of the controller 520 and information provided by the controller 520.

FIGS. 6A through 6C are tables showing PDG information according to an embodiment of the present invention.

Referring to FIG. 6A, when PDG information is one of the elements of a list (e.g., $EF_{LIST}$) that can use a USIM service, PDG information can be stored in the USIM and can be loaded from the USIM.

In one embodiment, PDG information is stored in an $EF_{PDG}$. The description of an elementary file (EF) will be omitted.

First, in access conditions, in order to perform a READ operation, a personal identification number (PIN) is required and the READ operation can be performed when the PIN matches a user set number. An UPDATE operation, an ACTIVE, and a DEACTIVE operation may be set by a network administrator (ADM).

Each PDG information includes an address type having a size of 1 byte. Kinds of address types are shown in FIG. 6B. A value of 0x00 is set for an address type of a DNS name, i.e., a fixed qualified domain name (FQDN). A value of 0x01 is set for an address type of IPv4. A value of 0x02 is set for an address type of IPv6.

Each PDG information includes an address length having a size of 1 byte. The address length indicates a size of each address type.

Each PDG information includes a PDG address having a size of X byte. For example, an IPv4 type address has a size of 32 bits (i.e., X=4) and an IPv6 type address has a size of 128 bits (i.e., X=16).

Each PDG information includes maximum failed attempts having a size of 1 byte. A field of the maximum failed attempts exists only when the address type is the IPv4 type or the IPv6 type. The maximum failed attempts indicate the maximum number of unsuccessful attempts to gain access to the PDG using the IPv4 type address or the IPv6 type address. When the number of unsuccessful attempts reaches the maximum number, subsequent operations cannot proceed.

A caution grade of PDG information is shown in FIG. 6C. The caution grade of PDG information indicates that an operator should pay attention when he updates PDG information over the air. In some cases, it may be set not to allow transmission of PDG information over the air.

In the present invention, PDG information can be stored in the USIM of the terminal and can be updated, thereby solving inconvenience of a user due to lack of PDG information. Also, communication enterprises can operate networks efficiently.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for updating information on a packet data gateway (PDG) in a network-connected terminal, the method comprising:
    receiving an instruction indicating an update of PDG information from a network apparatus at the network-connected terminal; and
    receiving updated PDG information from the network apparatus, storing the updated PDG information in a storage unit, and performing an update operation at the network-connected terminal;
    wherein the updated PDG information comprises information indicating a caution grade of the PDG information; and
    wherein the caution grade of the PDG information indicates that an operator should pay, attention.

2. The method of claim 1, wherein the storage unit is a universal subscriber identity module (USIM) of the terminal.

3. The method of claim 1, wherein the updated PDG information comprises at least one of information indicating read, update, activation, and deactivation of the updated PDG information, information indicating an address type of the PDG, information indicating an address length corresponding to the address type of the PDG, and information indicating an address of the PDG.

4. The method of claim 3, wherein the address of the PDG is at least one of a fixed qualified domain name (FQDN), an IPv4 type address, and an IPv6 type address.

5. The method of claim 3, wherein when the address type of the PDG is one of an IPv4 type address and an IPv6 type address, the PDG information further comprises maximum failed attempts indicating the maximum number of unsuccessful attempts to gain access to one of the IPv4 type address and the IPv6 type address.

6. A method for providing information on a packet data gateway (PDG) in a network apparatus, the method comprising:
    determining if a provision of updated PDG information is requested;
    loading updated PDG information from a storage unit when the provision of updated PDG information is requested; and
    transmitting the loaded PDG information to a network-connected terminal;
    wherein the updated PDG information comprises information indicating a caution grade of the PDG information; and
    wherein the caution grade of the PDG information indicates that an operator should pay attention.

7. The method of claim 6, wherein the updated PDG information comprises at least one of information indicating read, update, activation, and deactivation of the updated PDG information, information indicating an address type of the PDG, information indicating an address length corresponding to the address type of the PDG, and information indicating an address of the PDG.

8. The method of claim 7, wherein the address of the PDG is at least one of a fixed qualified domain name (FQDN), an IPv4 type address, and an IPv6 type address.

9. The method of claim 7, wherein when the address type of the PDG is an IPv4 type address or an IPv6 type address, the PDG information further comprises maximum failed attempts indicating the maximum number of unsuccessful attempts to gain access to one of the IPv4 type address and the IPv6 type address.

10. A network-connected terminal for updating information on a packet data gateway (PDG), the network-connected terminal comprising:
    a communication module comprising a Radio Frequency (RF) processor and a baseband processor for communicating with another node;
    a PDG information manager that receives an instruction indicating an update of PDG information from a network apparatus via the communication module, receives updated PDG information from the network apparatus, stores the updated PDG information in a storage unit, and performs an update operation; and
    the storage unit comprising a Universal Subscriber Identity Module (USIM) for storing the PDG information;
    wherein the updated PDG information comprises information indicating a caution grade of the PDG information; and
    wherein the caution grade of the PDG information indicates that an operator should pay, attention.

11. The terminal of claim 10, wherein the updated PDG information comprises at least one of information indicating read, update, activation, and deactivation of the updated PDG information, information indicating an address type of the PDG, information indicating an address length corresponding to the address type of the PDG, and information indicating an address of the PDG.

12. The terminal of claim 11, wherein the address of the PDG is at least one of a fixed qualified domain name (FQDN), an IPv4 type address, and an IPv6 type address.

13. The terminal of claim 11, wherein when the address type of the PDG is one of the IPv4 type address and the IPv6 type address, the PDG information further comprises maximum failed attempts indicating the maximum number of unsuccessful attempts to gain access to one of the IPv4 type address and the IPv6 type address.

14. A network apparatus for providing information on a packet data gateway (PDG), the network apparatus comprising:
- a communication module comprising a cable processor, a Radio Frequency processor and a baseband processor for communicating with another node; and
- a PDG information manager that determines if a provision of updated PDG information is requested via the communication module, loads updated PDG information from a storage unit of the network apparatus when the provision of updated PDG information is requested, and transmits the loaded PDG information to a network-connected terminal for storage of the updated PDG information in a storage unit of the network-connected terminal;
- wherein the updated PDG information comprises information indicating a caution grade of the PDG information; and
- wherein the caution grade of the PDG information indicates that an operator should pay attention.

15. The network apparatus of claim 14, wherein the updated PDG information comprises at least one of information indicating read, update, activation, and deactivation of the updated PDG information, information indicating an address type of the PDG, information indicating an address length corresponding to the address type of the PDG, and information indicating an address of the PDG.

16. The network apparatus of claim 15, wherein the address of the PDG is at least one of a fixed qualified domain name (FQDN), an IPv4 type address, and an IPv6 type address.

17. The network apparatus of claim 15, wherein when the address type of the PDG is an IPv4 type address or an IPv6 type address, the PDG information further comprises maximum failed attempts indicating the maximum number of unsuccessful attempts to gain access to one of the IPv4 type address and the IPv6 type address.

18. A communication system for updating information on a packet data gateway (PDG), the communication system comprising:
- a network apparatus for determining if a provision of updated PDG information is requested, loading the updated PDG information when the provision of PDG information is requested, storing the updated PDG information in a storage unit, and transmitting the updated PDG information to a terminal; and
- a network-connected terminal for receiving an instruction indicating an update of the PDG information from a network, receiving the updated PDG information from the network apparatus, storing the updated PDG information in a storage unit, and performing an update operation;
- wherein the updated PDG information comprises information indicating a caution grade of the PDG information; and
- wherein the caution grade of the PDG information indicates that an operator should pay attention.

19. A non-transitory computer-readable recording medium having recorded thereon a program for updating information on a packet data gateway (PDG) in a network-connected terminal, the medium comprising:
- a first code segment for receiving an instruction indicating an update of PDG information from a network apparatus at the network-connected terminal; and
- a second code segment for receiving updated PDG information from the network apparatus, storing the updated PDG information in a storage unit, and performing an update operation, at the network-connected terminal;
- wherein the updated PDG information comprises information indicating a caution grade of the PDG information; and
- wherein the caution grade of the PDG information indicates that an operator should pay attention.

20. A non-transitory computer-readable recording medium having recorded thereon a program for providing information on a packet data gateway (PDG) in a network apparatus, the medium comprising;
- a first code segment for determining if a provision of updated PDG information is requested;
- a second code segment for loading updated PDG information from a storage unit when the provision of updated PDG information is requested; and
- a third code segment for transmitting the loaded PDG information to a network-connected terminal;
- wherein the updated PDG information comprises information indicating a caution grade of the PDG information; and
- wherein the caution grade of the PDG information indicates that an operator should pay attention.

* * * * *